June 7, 1932.   H. H. WERMINE   1,862,128
CONNECTER FOR ELECTRIC CONDUCTORS
Filed March 7, 1928
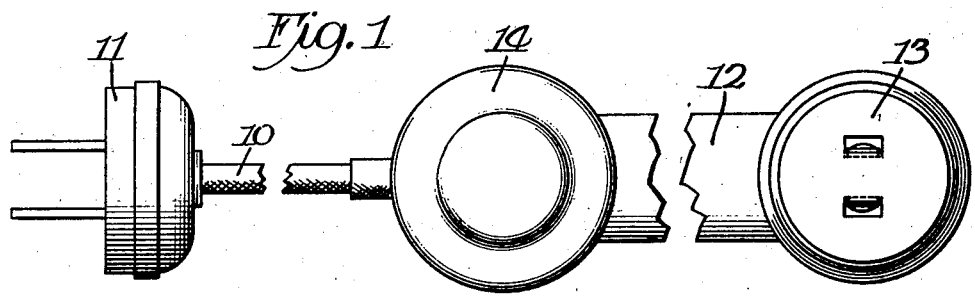
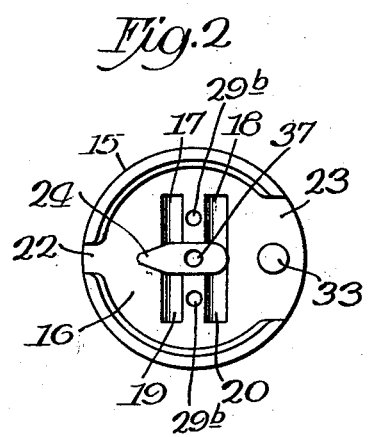
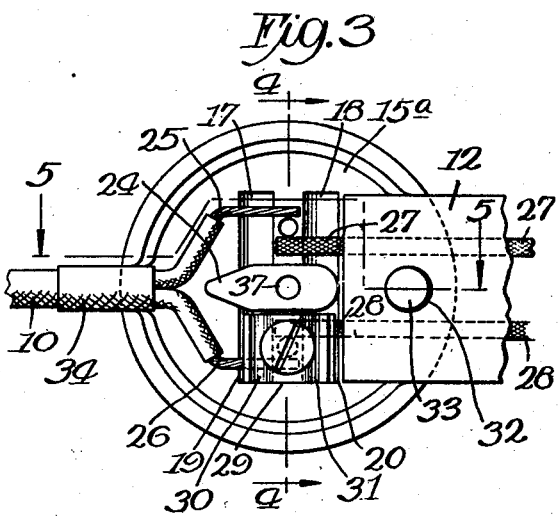
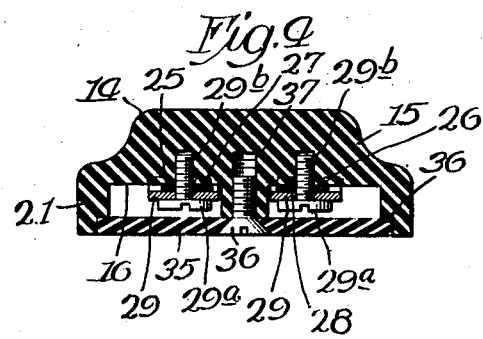
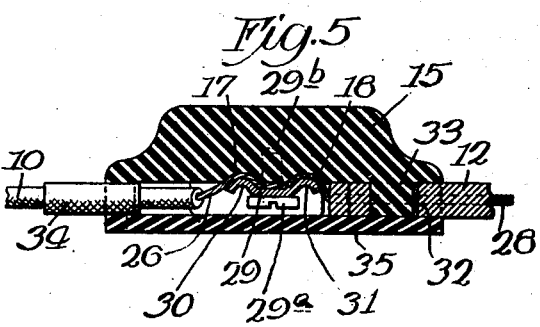
Inventor:
Hugo H. Wermine
By Fisher, Sowl, Clapp & Soans. Attys.

Patented June 7, 1932

1,862,128

UNITED STATES PATENT OFFICE

HUGO H. WERMINE, OF VILLA PARK, ILLINOIS, ASSIGNOR TO BELDEN MANUFACTURING COMPANY, OF CHICAGO, ILLINOIS, A CORPORATION OF ILLINOIS

CONNECTER FOR ELECTRIC CONDUCTORS

Application filed March 7, 1928. Serial No. 259,864.

This invention relates to connecters for electrical conductors, and its principal object is to provide a connecter for facilitating the making of substantially permanent electrical connection between a pair of conductors. Another object of the invention is to provide a connecter for facilitating the making of substantially permanent electrical connection between the conductors of one duplex electric conductor cord and the conductors of another duplex electric conductor cord. It is a special object of this invention to provide a neat appearing device for facilitating the establishment of good electrical connection between the conductors of an ordinary duplex extension cord and the conductors of a relatively flat duplex cord, which I use for conducting electric current from one place in a room to another by running the flat floor cord under a rug or other floor covering to thereby conceal the cord. In general, the object of this invention is to provide an improved connecter of the class described.

Other objects and advantages of the invention will be understood by reference to the following specification and accompanying drawing, in which I have illustrated a connecter embodying a selected form of my invention, and in which drawing:

Figure 1 is a plan of a complete floor cord showing a connecter according to the present invention used for connecting a substantially round duplex cord to a flat duplex cord.

Figure 2 is a bottom plan of the body member, certain connecting parts, and a cover being omitted to facilitate illustration of the body member.

Figure 3 is a view similar to Figure 2, but on an enlarged scale, and showing the manner of connecting a round cord to a flat cord.

Figures 4 and 5 are sections on the lines 4—4 and 5—5, respectively, of Figure 3.

Referring now to the drawing, I have shown in Figure 1 a complete floor cord, which, in the present instance, includes a substantially round duplex cord 10 having a male plug connecter portion 11 secured to one end, a duplex flat cord 12 having a female plug connecter portion 13 at one end and a connecter member 14 electrically connecting the respective conductors of the duplex cords 10 and 12. The flat cord portion 12 is adapted to be placed under a rug or the like to conduct electric current from one side of the rug to the other, the members 13 and 14 being preferably disposed closely adjacent the opposite edges of the rug, so that no material portion of the flat cord 12 will be visible. The conductor portion 10 may have any desired decorative covering, such as a braided silk covering, so as to enhance its appearance, and the connecter 11 may be connected to any convenient outlet, such as a floor or wall outlet. The term "round" as used herein, obviously includes an oval as well as a truly circular shape.

The connecter 14 comprises a main body member 15 preferably of insulating material such as bakelite, and is provided with a recess 15$^a$ in its bottom so as to provide a recessed bottom surface 16. The bottom surface 16 is provided with offset portions or grooves 17, 18, 19 and 20. (See Figure 2.) The recessed bottom surface 16 is preferably formed by providing a peripheral flange 21 integral with the body member 15 and depending from its said bottom surface 16.

The depending peripheral flange 21 is provided with notches 22 and 23 for receiving and closely fitting over the round and flat duplex cords 10 and 12 respectively, whereby the end portions of the respective cords may be disposed within the recess 15$^a$ in the bottom of the body member. As shown in Figure 3, the end portions of the conductors are bared and disposed over the grooves 17, 18, 19 and 20, a rib 24 being provided as an integral part of the body and depending from the bottom surface 16 for separating the conductors of the cord so as to prevent accidental contacting of the conductors.

For effecting electrical connection between the conductors 25 and 26 of the round duplex cord and the conductors 27 and 28 respectively of the flat duplex cord, I provide metallic clamping plates such as shown at 29 in Figures 3, 4 and 5. The clamping plates 29 are provided with offset portions 30 and 31 adjacent their oposite edges, and which offset portions are adapted to cooperate with the grooves 17 and 18 or 19 and 20 to interlock the conductor end portions with the body member. For effecting such interlocking, I provide screw members 29ª which threadedly engage tapped apertures 29ᵇ in the body member 15 and which pass through suitable apertures provided in the clamping plates intermediate the offset portions 30 and 31.

The above described form of connection is particularly desirable where the flat cord 12 includes relatively flat conductor members; that is, conductor members of relatively wide but thin cross-sectional dimensions. It will be noted that it is not necessary to twist or bend the conductors around a screw or the like in order to effectively anchor the cord so as to prevent its being disconnected from the connecter by excessive pulling thereon. Obviously, it would be comparatively difficult to bend or wind a flat conductor such as contemplated in the present case around a screw or the like which extends crosswise of the thickness of the conductor, and hence the present form of connection is highly desirable.

Flat conductors such as shown at 12 may be formed by embedding flat braided copper conductor members such as 27 and 28 in a relatively flat strap-like member of insulating material, such as rubber or the like. The conductors are, of course, spaced apart so as to prevent electrical contact there-between, and consequently there is a relatively wide strip of rubber between the conductors, as clearly shown in Figure 3. For further anchoring the flat conductor to the body member 15, I provide the conductor with an aperture 32 preferably disposed in the relatively wide strip of material between the conductors, and this aperture is adapted to fit over a stud 33 or the like, which depends from and is preferably integral with the body member 15. The round duplex conductor 10 may be provided with a sleeve 34 of suitable material such as rubber adjacent its end, so as to protect the covering thereof from being worn where it engages the flange 21 of the body member, and also to prevent unravelling of the braided covering. Such a sleeve also serves to cause the conductor to more tightly fit in the groove 22 so that it will not readily slide therethrough.

For enclosing the above described connections between the conductors 25 and 27, and 26 and 28, respectively, I provide a cover plate 35 which is adapted to be seated on a shoulder 36 provided in the flange 21, and a screw 36 engaging a tapped aperture 37 in the rib 24 serves to lock the cover on the body member. The cover plate is preferably provided with lug portions which fit in the grooves 22 and 23 so as to prevent turning of the cover and possible turning of the screw 36 and subsequent separation of the cover plate and body member.

The above described connecter provides a device whereby conductors of like or different cross-sectional dimensions may be easily and quickly electrically connected. Obviously, good electrical connection between the conductors is established through the agency of the clamping plates which are of metal, preferably brass, and tightly pressed against the conductors by means of the screws 29ª, 29ª. The connecter may be made relatively small in over-all dimensions and its outside surface may be suitably ornamented so that it presents a neat appearance and will not present an unsightly appearance when disposed, for instance, adjacent the edge of a rug.

I am aware that various changes in the form, construction and arrangement of parts may be made without departing from the spirit of the invention, the scope of which should be determined by reference to the following claims, which should be construed as broadly as possible consistent with the state of the art.

I claim as my invention:

1. In a connecter for electrically connecting the respective conductors of a substantially round duplex conductor to the respective conductors of a substantially flat duplex conductor member, the combination of a main body member having a recessed bottom portion provided with a pair of offset surface portions, a centrally disposed rib disposed between said offset portions and depending from said recessed bottom surface, said rib extending lengthwise of the conductors and being effective to separate the individual conductors of each duplex conductor, metal clamping plates having offset portions overlying said offset bottom surface portions, screw means for forcing said plates towards said bottom surface so as to cause the offset portions of the clamping plates to cooperate with the respective offset bottom surface portions whereby conductor portions interposed between the plate and bottom surface are interlocked with the body member and electrically connected through the metallic clamping plate, a bottom cover member for enclosing said recessed bottom portion and clamping plates, and means for locking said cover member on said body member.

2. In combination, a duplex electrical conductor of substantially round cross-section, a second duplex conductor of substantially flat cross-section and including a pair of spaced conductors disposed in substantially the same plane, and a connecter for connecting adjacent ends of said duplex conductors comprising a main body member of insulating material, said body member having a bottom surface and a peripheral flange depending therefrom and cut away at diametrically opposite portions for receiving said conductors, said bottom surface being provided with a pair of grooves extending crosswise of the conductors to be connected, metal clamping plates having offset portions adapted to interlock with said grooves, screw means for effecting such interlocking whereby the clamping plates are adapted to clamp end portions of the conductors to be connected between the plates and bottom surface of the body member and whereby the offset portions of the plates are effective to force portions of the conductors into the respective grooves so as to interlock the conductors with the body member, a cover plate seated on said peripheral flange for enclosing said recessed bottom portion, and means for locking said cover plate on said body member.

3. In combination, a duplex electrical conductor of substantially round cross section, a second duplex conductor of substantially flat cross section and including a pair of spaced conductors disposed in substantially the same plane, and a connecter for connecting adjacent ends of said duplex conductors comprising a main body member of insulating material, said body member having a bottom surface and a peripheral flange depending therefrom and provided with a pair of oppositely disposed notches respectively receiving and fitting around said duplex conductors, a stud depending from said bottom surface for engaging a portion of the flat conductor to anchor the same on said body member, and said bottom surface being provided with a rib depending therefrom and having a pair of grooves, one on each side of said rib and extending crosswise of the length of the conductors to be connected, metal clamping plates having offset portions adapted to interlock with said grooves, screw means for effecting such interlocking whereby the clamping plates are adapted to clamp end portions of the conductors to be connected between the respective plates and the bottom surface of the body member and whereby the offset portions of the plates are adapted to be forced into electrical contact with such conductor portions so as to electrically connect the same, said conductor portions being incidentally forced into interlocking engagement with the respective grooves, a cover plate seated on said peripheral flange for enclosing said recessed bottom portion and clamping plates, and means for locking said cover plate on said body member.

HUGO H. WERMINE.